Patented Jan. 3, 1928.

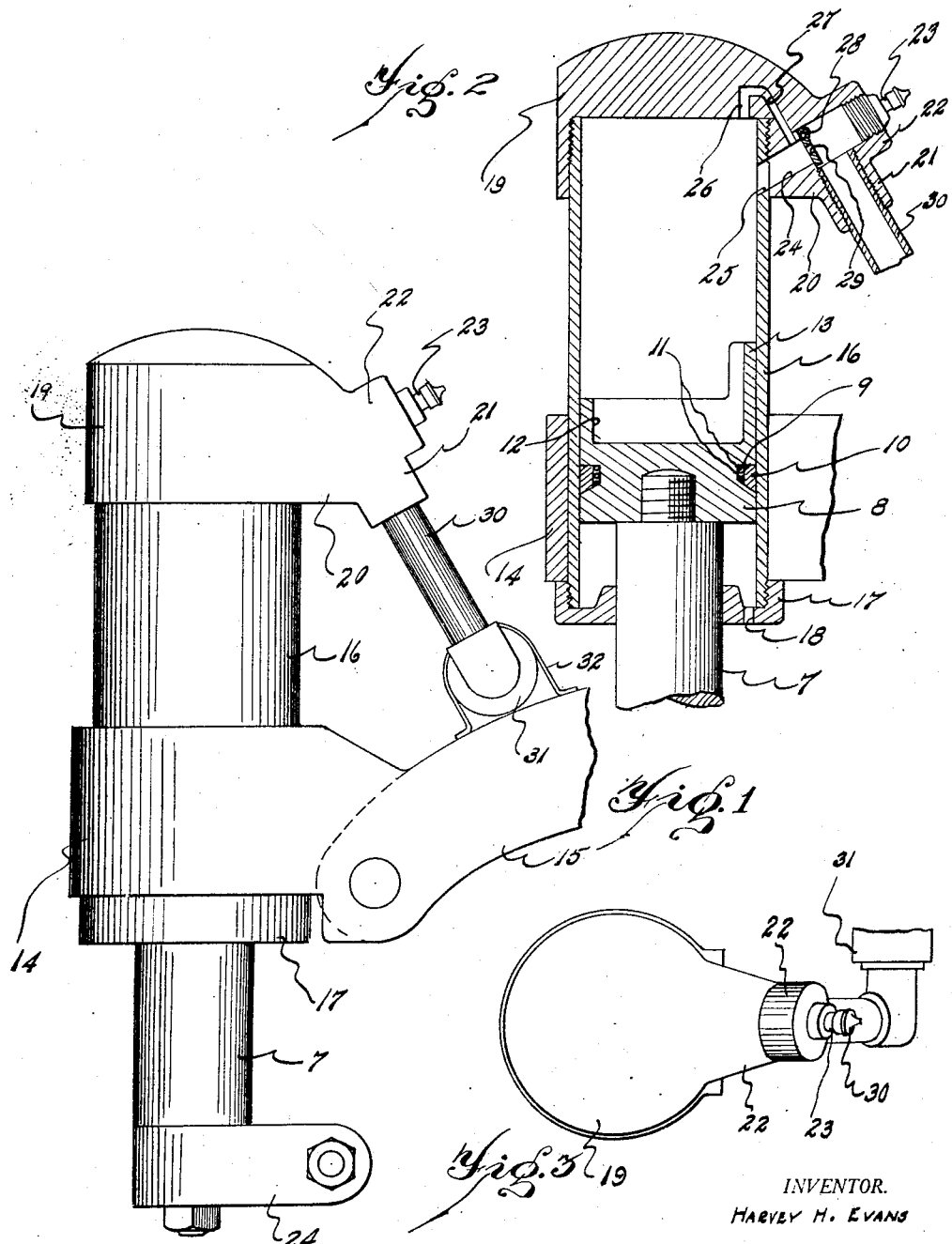

1,654,798

UNITED STATES PATENT OFFICE.

HARVEY H. EVANS, OF DETROIT, MICHIGAN.

MULTISHOCK ABSORBER.

Application filed June 26, 1924. Serial No. 722,621.

My invention relates to a new and useful improvement in a multi-shock absorber adapted for use with vehicles, particularly automobiles, and has for its object the provision of a shock absorber adapted for mounting between the body of an automobile and the springs, so arranged and constructed as to relieve the body from jars and jolts resulting from passage over uneven surfaces.

Another object of the invention is the provision of a shock absorber of this class in which fluid is compressed to provide the desired cushion effect, a piston being slidably mounted in a cylinder for compressing the fluid and so constructed and arranged as to permit the shock absorber to return to normal condition slowly after compressing of the fluid.

Another object of the invention is the provision of an enlarged outlet opening leading from a compressing cylinder for permitting the rapid exit of fluid from the cylinder and so arranged as to be automatically partially closed so as to retard the return of the fluid into the cylinder after being compressed therefrom, a by-pass being provided in the cylinder for assisting in this operation.

Another object of the invention is the provision in a shock absorber of this class of a compressing cylinder having an outwardly projection portion adapted upon movement of the cylinder beyond a predetermined point for closing gradually the exit opening formed in the cylinder.

Another object of the invention is the provision of an auxiliary reservoir or fluid reserve chamber into which the fluid is compressed when the vehicle is subjected to a sudden shock or jolt.

Other objects will appear hereinafter.

The invention consists in the combination and arrangement of parts hereinafter described and claimed.

The invention will be best understood from a reference to the accompanying drawings which form a part of this specification, and in which, Fig. 1 is a side elevational view of the invention;

Fig. 2 is a central vertical sectional view of the invention in fragment,

Fig. 3 is a top plan view of the invention showing the auxiliary reservoir in fragment.

In the invention I provide a piston rod 7 connected to one end of which is a piston head 8 having a peripheral groove 9 formed therein, in which is positioned a suitable packing ring 10, normally held in outwardly pressed position by wire springs 11 positioned behind the packing. The upper end of the piston head 8 is formed with a recess 12 to provide a cup for the reception of oil or other lubricant so that the piston head 8 in its movements in the cylinder with which used will be lubricated at all times. This recess 12, in addition to lubricating, also serves to form a sealing filament around the edges of the piston head 8. Projecting outwardly from the inner end at one side of the piston head 8 is a closing lip 13 which operates at times in the manner of a sliding valve, as described herein. Secured to the vehicle body 15 is a supporting bracket 14, which is clamped or otherwise secured to the cylinder 16, in which the piston head 8 is slidably mounted. A removable bottom plate 17 is threaded on the cylinder 16 and provided with a central opening through which the piston rod 7 projects. The bottom 17 is provided with a bleed opening 18. Threaded on the upper end of the cylinder 16 is a cap 19, having an enlargement or boss 20 formed at one side thereof, projecting outwardly from which is a nipple 21, interiorly threaded for the reception of one end of the pipe 30. A neck 22 projects outwardly from one side of the boss 20 and is internally threaded for accommodating an air valve 23, which is mounted therein. This air valve is of usual structure, and inasmuch as it forms no specific part of the present invention, its structure is not detailed. The nipple 21 communicates with an opening 24 formed in the boss 20 which is adapted to register with an opening 25 formed in the cylinder 16 so that the pipe 30 is in communication with the interior of the cylinder 16. The opening 24 also communicates with the interior of the cylinder, by means of a by-pass comprising the passage 27 which communicates with the passage 26 formed in the cap 19. A flap valve 28 is swingably mounted on the boss 20 so as to close the passageway 24 and retard the passage of air from the pipe 30 into the interior of the cylinder 16. This flap valve is provided with a centrally disposed opening 29 so that the communication between the pipe 30 and the opening 24 is never entirely closed, the opening 29, however, being small so as to permit passage of air from the pipe 30 into the opening 24 slowly. As shown in the drawings, the pipe 30 communicates with the larger pipe 31 which is secured to the body 15 by means of suitable brackets 32. This pipe 31 serves as a reserve chamber or auxiliary reservoir so that when fluid is placed in the cylinder 16 and the piston head 8 is moved upwardly toward the cap 19, the fluid will be forced outwardly through the opening 24, through the pipe 30 into the reserve chamber or auxiliary reservoir 31 under pressure. For the purpose of illustration, only one of the cylinders 16 is shown. However, in operation, one of the cylinders is connected at each side of the vehicle and each communicates with one end of the pipe or reserve chamber 31. As a shock or jar is transmitted to the vehicle, causing the springs and the body to approach each other, the fluid will be compressed into the reserve chamber 31 by each of the pistons operating in its respective cylinder.

As the jar is delivered to the vehicle, and the springs move into closer approach to the body 15, the piston head 8 will be moved upwardly toward the cap 9, forcing the fluid from the cylinder into the reserve chamber as stated. This fluid will pass through the opening 24 and cause the raising of the flap valve 28. After the jar has been transmitted to the vehicle and the springs and body move backwardly to normal relative position, the piston head 8 will move downwardly in the cylinder, thus permitting the fluid compressed in the chamber to travel backwardly through the pipe 30. The flap valve 28 will in this case be closed and the fluid will be forced to travel through the reduced opening 29, thus preventing a rapid separation of the springs and the body after the jar so that the rebound is destroyed and the shock absorber serves as a check to jars and jolts in both directions of movement of the piston head 8.

Upon delivery of a severe jar to the vehicle, should the piston head 8 move upwardly so as to closely approach its limit of movement in the cylinder 16, the outwardly projecting lip 13 will cover gradually the opening 25 so as to close communication between the pipe 30 and the cylinder 16 through the opening 24. Further movement of the piston will then cause the fluid to travel through the passages 26 and 27, these passages being considerably reduced in area relatively to the area of the opening 24, so that a check on the movement of the piston head is provided. After the movement of the lip 13 across the opening 25 so as to close communication in this manner, upon the beginning of movement of the piston head 8 downwardly in the cylinder, the fluid compressed into the reserve chamber will travel backwardly through the pipe 30, through the opening 29, and through the passages 27 and 26, these passages serving as a by-pass when the direct communication is closed by the lip 13.

With a structure such as described, there is provided an effective shock absorber which may be used with a suitable fluid to serve to eliminate the jars and jolts which ordinarily would be delivered to the body of the vehicle. There is also, as will appear from the description, provided a means for increasing the resistance in the cylinder where a sudden excessive jolt or jar is delivered to the vehicle.

The fluid when forced originally in the cylinder or reserve chamber may be pumped through the valve 23 and originally placed under some pressure.

While I have illustrated and described the preferred form of construction, I do not wish to limit myself to the precise details of structure shown in the drawings, but desire to avail myself of such variations and modifications as come within the scope of the appended claims.

Having thus described my invention, what I claim as new and desire to secure by Letters Patent, is:—

1. A shock absorber of the class described, comprising a cylinder adapted for mounting on the body of a vehicle; a piston head slidably mounted in said cylinder; an extension projecting outwardly from the inner end of said piston head and adapted upon movement closely approaching the limits of movement in one direction in said cylinder for closing an outlet opening formed in said cylinder; a piston rod connected to said head; means for connecting the outer end of said piston rod to the springs of said vehicle, said cylinder having a by-pass communicating with said opening adapted for conducting fluid from said cylinder upon further movement of said piston head in said cylinder after the closing of said opening by said extension.

2. A shock absorber of the class described, comprising a cylinder; a piston head slidably mounted in said cylinder; an extension projecting outwardly mounted upon the inner end of said piston head; an outlet pipe communicating with said cylinder through an opening formed therein, said extension being adapted for closing said opening upon movement of said piston head in said cylinder beyond a predetermined point, said outlet pipe communicating through a by-pass with said cylinder, said communication through said by-pass being open at all times.

3. A shock absorber of the class described, comprising a cylinder; a piston head slidably mounted in said cylinder; an extension projecting outwardly from the inner side of said piston head and engaging the inner surface of said cylinder; an outlet pipe communicating with said cylinder through an opening formed therein, said extension being adapted for closing said opening upon movement of said piston head in said cylinder in one direction beyond a predetermined point, said outlet pipe communicating with said cylinder through a by-pass, said by-pass being open at all times; and a reserve chamber communicating with said outlet pipe.

4. A shock absorber of the class described, comprising a cylinder; a piston head slidably mounted in said cylinder; an extension projecting outwardly from the inner edge of said piston head at one side thereof and lying in engagement with the inner surface of said cylinder; a piston rod connected to said piston head and projecting outwardly from said cylinder; means for connecting the outer end of said piston rod to the springs of the vehicle; means for mounting said cylinder on the body of a vehicle; an outlet pipe communicating with said cylinder through an opening formed therein, said extension being adapted for closing said opening upon movement of said piston head in said cylinder in one direction beyond a predetermined point, said outlet pipe being in communication with said cylinder through a by-pass, said by-pass being open at all times; and a reserve chamber communicating with said outlet pipe.

5. A shock absorber of the class described, comprising a cylinder; a piston head slidably mounted in said cylinder; an extension projecting outwardly from the inner side of said piston head, and lying in engagement with the inner surface of said cylinder, said piston head being provided on its inner side with a recess for providing an oil receptacle; an outlet pipe communicating with said cylinder through an opening formed therein, said communication being controlled by a flap valve having a comparatively small opening formed therein, said extension being adapted for closing the opening in said cylinder upon movement of said piston head beyond a predetermined point in one direction in said cylinder, said outlet pipe being in communication with said cylinder through a by-pass, said communication being controlled by said flap valve and open at all times.

6. A shock absorber of the class described, comprising a cylinder; a piston head slidably mounted in said cylinder; an outlet pipe communicating with said cylinder through an opening formed therein; means carried on said head adapted for closing said outlet opening upon movement of said piston head in said cylinder beyond a predetermined point, said outlet pipe communicating through a by-pass with said cylinder, said communication through said by-pass being open at all times.

In testimony whereof, I have signed the foregoing specification.

HARVEY H. EVANS.